Figure 1:
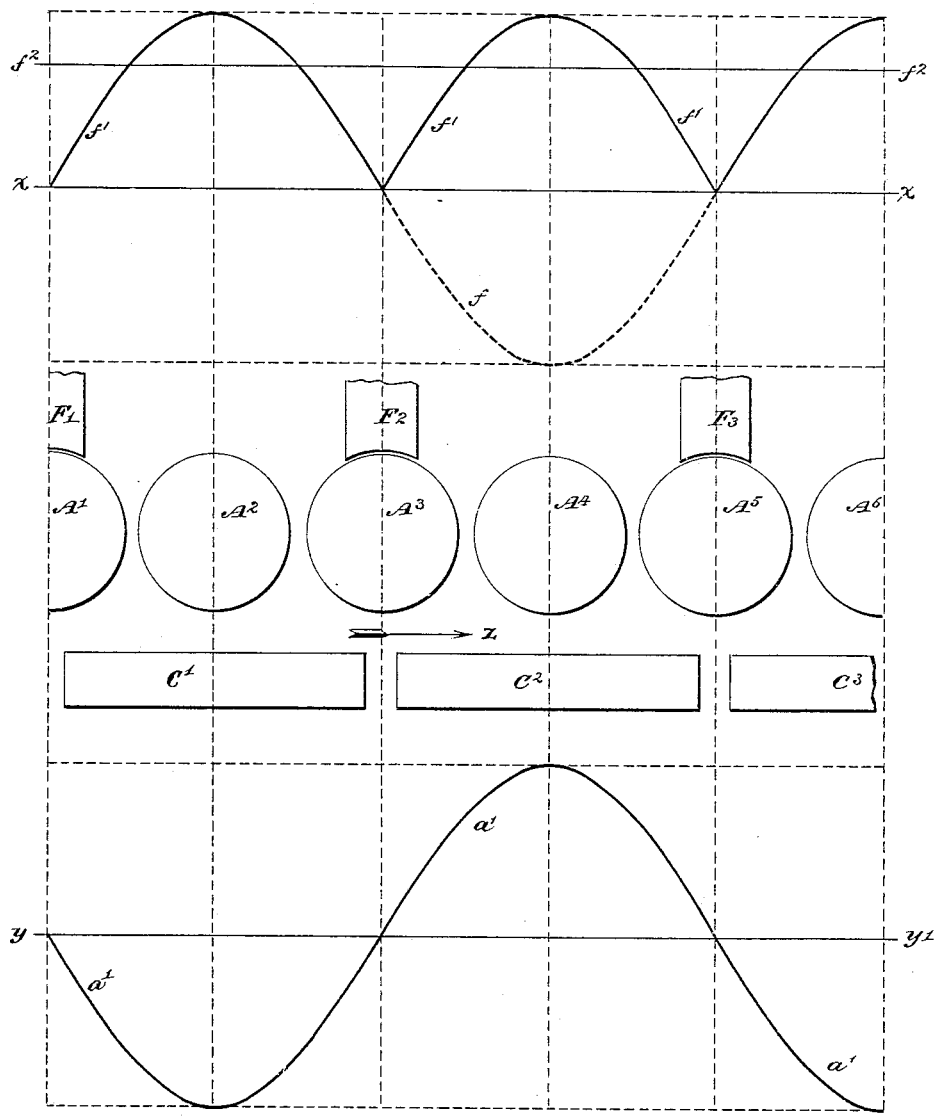

(No Model.) 2 Sheets—Sheet 1.

W. STANLEY, Jr.
ALTERNATE CURRENT ELECTRIC MOTOR.

No. 392,471. Patented Nov. 6, 1888.

Witnesses.
Geo. W. Breck
Carrie E. Ashley

Inventor,
Wm. Stanley, Jr.
By his Attorneys
Pope Edgecomb & Perry (No Model.) 2 Sheets—Sheet 2.
W. STANLEY, Jr.
ALTERNATE CURRENT ELECTRIC MOTOR.
No. 392,471. Patented Nov. 6, 1888.
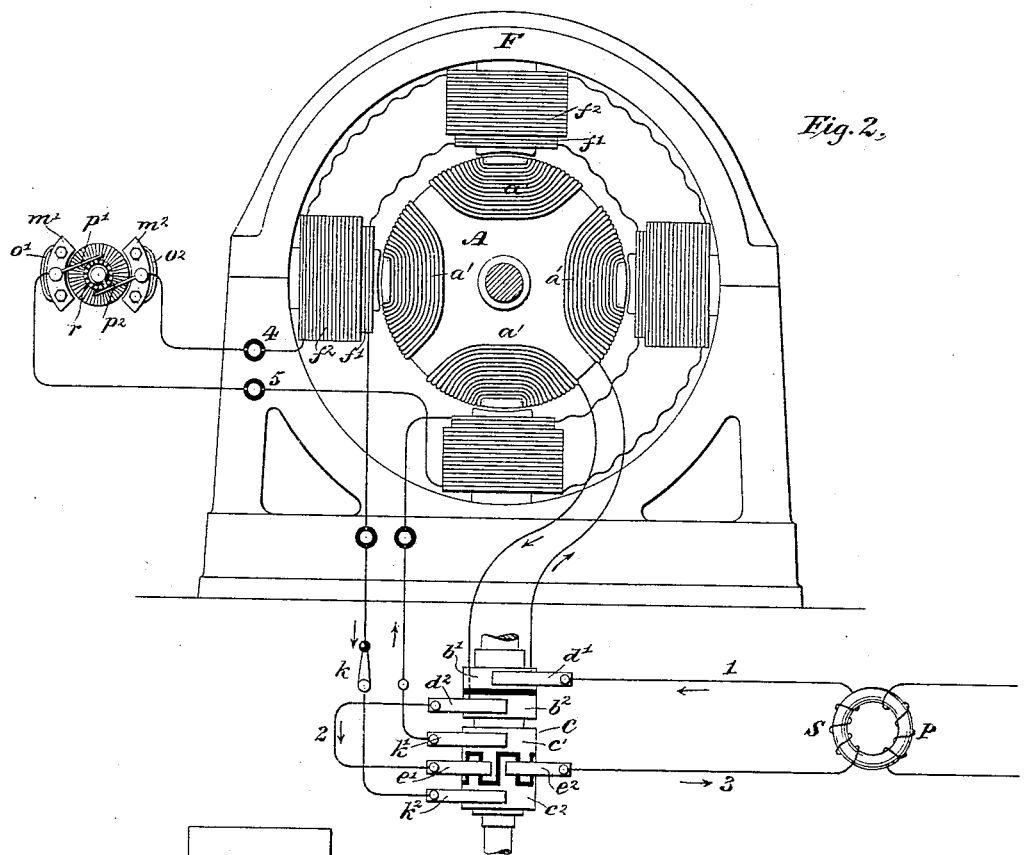
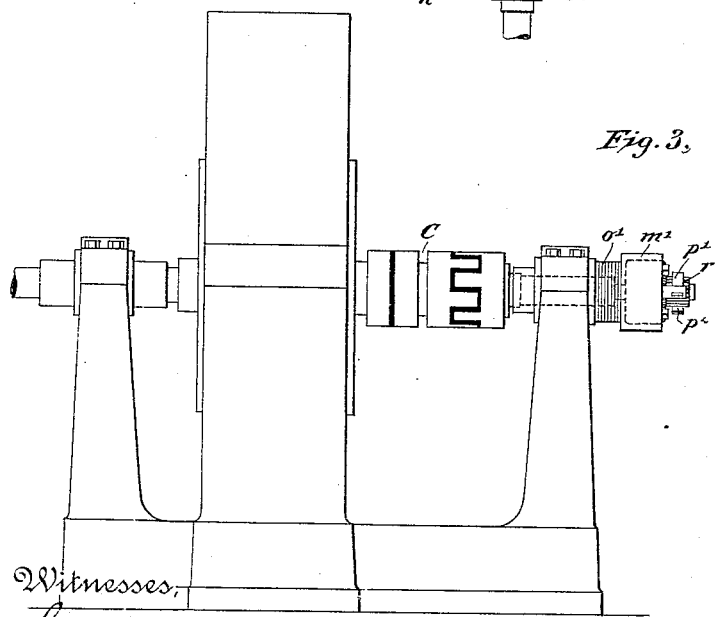
Witnesses,
Geo. W. Breck
Carrie E. Ashley
Inventor,
Wm. Stanley, Jr.
By his Attorneys
Pope Edgecomb & Terry.

United States Patent Office.

WILLIAM STANLEY, JR., OF GREAT BARRINGTON, MASSACHUSETTS, ASSIGNOR TO THE WESTINGHOUSE ELECTRIC COMPANY, OF PITTSBURG, PENNSYLVANIA.

ALTERNATE-CURRENT ELECTRIC MOTOR.

SPECIFICATION forming part of Letters Patent No. 392,471, dated November 6, 1888.

Application filed December 9, 1887. Serial No. 257,400. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Alternate-Current Electric Motors, (Case 193,) of which the following is a specification.

The invention relates to the construction of motors designed to be driven by alternating electric currents.

In operating an electric motor by alternating electric currents, if the currents are sent through the armature and the field-magnet coils there will be a rapid change of polarity both in the armature and in the field-magnet; but if the connections are such as to cause the poles of the field-magnet and the corresponding approaching poles of the armature to be opposite in character there will be an attraction exerted which will tend to revolve the armature until the opposite poles confront each other. The relations of the coils of the field-magnet or of the armature must therefore be changed at this point, so that a repulsive force will be exerted between the two to cause the continued movement of the armature. This is effected by means of a commutator. In this manner the armature may be caused to start and revolve up to a given speed; but for the purpose of avoiding the necessity of reversing the polarity of the field-magnet at each reversal of the alternate current the direction of the current through the field-magnets is rendered constant by a suitable commutator, which is so organized as to reverse the connections of the field-magnet with each reversal in the direction of the current. With such an organization it is found that the rate of rotation of the armature will fluctuate—that is to say, it will first rise to a speed proportionate to the number of alternations occurring in the direction of the current, and will then fall behind or lag, and then accelerate again, thus causing a constant variation in the speed. The special object of this invention is to overcome this defect and to render the speed constant. To accomplish this there is added to the motor constructed in the general manner indi-cated a supplemental coil applied to one element, as the field-magnet of the machine, which is connected with a source of constant current tending to maintain a constant polarization of the field-magnet. The purpose and effects of this organization will be more fully described in connection with the accompanying drawings.

Referring to the drawings, Figure 1 is a theoretical diagram, serving to illustrate the current phases and probable effects. Fig. 2 is a side elevation of the machine, together with a diagram of the circuit-connections; and Fig. 3 is an end view.

Referring to Fig. 1, $F'$ $F^2$ $F^3$ represent the field-magnet poles of the motor; $A'$ $A^2$ $A^3$, &c., the armature-coils in their various positions, and $C'$ $C^2$ $C^3$ represent the commutator-connections. A line, $f'$ $f'$, indicates the current through the field-magnet coils, and a line, $a'$ $a'$, the current through the armature-coils. $x$ $x$ represent the normal or neutral line of the field-magnet current, and $y$ $y$ the neutral line of the armature-current.

It is here assumed that the armature and field-magnet are connected in series; but the current through the field-magnet is so commutated that when the speed of the armature has risen to what may be termed the "synchronizing-speed" the commutator will render that current which is delivered to the armature continuous in direction. If, therefore, the field-magnet is revolved in the direction indicated by the arrow $z$, it will be noticed that as a pole passes from the position of $A'$ to the position of $A^2$ the currents in the armature and in the field-magnets are in opposite directions, and the connections are assumed to be such as to produce like poles at $F'$ and $A'$. Therefore a repulsion is exerted, which causes the armature to move in the direction indicated. The character of the pole of the armature, however, remains the same until it reaches the position $A^3$, where, the current having fallen to the normal $y$ $y$, the polarization is reduced to zero; but from the position $A^2$ to the position $A^3$ the pole has been attracted by the pole $F^2$, which is of opposite polarity from the pole of the armature; but it will be noticed that at the point $A^3$ opposite the pole $F^2$ there will be no force tending to further revolve the armature, for the reason that there is no south pole as yet established at $A^3$, and the current of the field-magnet has fallen to the zero-point, as indicated by the line $f'$, touching the normal $x$. Therefore the power of the motor at this moment is very much reduced. When, therefore, the speed of the motor has once risen to such a point that the neutral points in the currents occur simultaneously with the arrival of the poles of the armature opposite the poles of the field-magnet, then the motor is in such condition that its strength is lessening, and therefore its speed of rotation will fall. This will cause the armature to lag, so that the reversals will take place slightly before the arrival of the armature-poles at the points opposite the field-magnet poles, and thus the tendency will again be to accelerate the movement of the armature and there will be a fluctuation in its rate. When the armature has reached the neutral point and passed beyond toward the position $A^4$, the direction of the current through the field-magnet has been rectified by the plate $C^2$, so that it is represented by the full line $f'$ instead of by the dotted line $f$. If, now, some means are devised for rendering the polarization of the field-magnet approximately constant, or, in other words, rendering the line $f' f'$ more nearly parallel with the line $x\,x$, then there will be a more constant force impelling the armature. This is accomplished by means of the supplemental current, which is indicated by the line $f^2 f^2$. This current tends to magnetize the field-magnets constantly in a given direction. By reason of the inductive action in the supplemental circuit applied to the field-magnet, the latter acting in some sense as the secondary of an induction-coil, of which the circuit traversed by the current $f' f'$ is the primary, the rise and fall of current $f^2 f^2$ will be materially modified.

In practice, however, it is found that other effects combine to produce a very nearly constant field.

For the purpose of carrying the invention into practice many different devices may be employed. A convenient form is that shown in Figs. 2 and 3, in which F F represent the field-magnets of the motor, and A the armature. The field-magnet is wound with coils $f' f'$, and the armature with coils $a' a'$. The coils $a'$ are connected, through collecting-rings $b' b^2$ and their corresponding brushes, $d' d^2$, with the conductors 1 and 2. The conductor 1 leads from one terminal of a suitable source of alternating electric currents—such, for instance, as the secondary coil S of a converter whose primary coil is shown at P. The conductor 2 leads to a commutating-brush, $e'$, applied to a commutator, C. The terminals of the field-magnet coils $f' f'$ are connected with two brushes, $k' k^2$, applied to the respective sides $c' c^2$ of the commutator C, while the brush $c^2$ corresponding to the brush $c'$ is connected, through a conductor, 3, with the other terminal of the coil S. By this means the direction of the current through the field-magnet coils will be reversed at each pole-passage of the armature, so that when the speed of the armature corresponds to the alternations of the current the current through the field-magnet will be continuous in direction. The supplemental current is in this instance applied through supplemental coils $f^2 f^2$, the terminals of which are connected by conductors 4 and 5 with the contact-brushes $p'$ and $p^2$ of a supplemental generator carried upon the armature-shaft of the motor. This generator may have its field-magnet poles thrown out from the bearing K of the armature-shaft of the motor, as shown at $m' m^2$, and supplied with coils $o'$ and $o^2$. The armature is provided with a commutator, $r$, and is a self-exciting machine of any suitable character. The brushes $p'$ and $p^2$ are applied to the commutator $r$. It is not necessary, however, to generate this supplemental current by a separate exciter in the precise manner shown; but various means may be resorted to for obtaining a constant current which shall serve to magnetize the field-magnets of the motor in the general manner described.

A machine organized in this manner will have the advantage of creating within itself the counter electro-motive force which will regulate the current flowing through it in much the manner of an ordinary direct-current machine.

When the motor has acquired a proper speed, the field-magnet coils $f' f'$ may, if it is desired, be cut out of circuit by an automatic or hand device—such, for instance, as a switch, $k$.

I claim as my invention—

1. The combination of a field-magnet, coils for magnetizing the same, an armature, a source of alternating electric currents, a commutator through which the currents are delivered to the field-magnet coils, a supplemental circuit, and a source of constant electric currents connected through such supplemental circuit, tending to produce constant magnetism in the field-magnet.

2. The combination, substantially as described, with a source of alternating electric currents, of a motor receiving currents alternating in direction in one of its elements, a supplemental armature having an independent field, and a circuit therefor assisting the magnetizing effect of the commutated current, substantially as described.

3. The combination, in an alternate-current electric motor, of circuit-connections through which the alternate current is delivered to the armature, a commutator through which connections are made with the field-magnet coils, an auxiliary coil applied to the field-magnet, a source of currents constant in direction connected therewith, and means for cutting out of circuit the first-mentioned field magnet coils.

4. In an alternate-current electric motor, the combination of contact-rings upon the shaft of the armature, connections therefrom with the terminals of the armature-coils through which alternating currents are delivered to the armature, a rectifying-commutator upon the armature-shaft through which a rectified current is delivered to the field-magnet when the motor is revolved at a predetermined speed, and an independent source of currents which are continuous in direction and delivered to the field-magnet independently of said rectifying-commutator.

5. The combination, with the armature and its shaft of an alternate-current electric motor, of the contact-rings $b'$ and $b^2$, connected with the respective terminals of the armature-coils, a contact-brush, $d'$, connected with the supply-circuit, the rectifying-commutator C, having plates $c'$ and $c^2$, the brushes $k'$ and $k^2$, respectively connected with the terminals of the field-magnet coils, the brush $e'$, making alternate connection through the two plates and electrically connected with the brush $d^2$, and the brush $e^2$, making alternate connection with the two plates $c'$ and $c^2$ and connected with the source of alternating currents.

6. The combination of a field-magnet, coils for magnetizing the same, an armature, a source of alternating electric currents, a commutator through which the currents are delivered to the field-magnet coils, a supplemental circuit applied to the field-magnet for polarizing the same, a continuous current-generator upon the armature-shaft, and connections from said generator through the supplemental circuit.

7. The combination of a field-magnet, coils for magnetizing the same, an armature, a source of alternating electric currents, a commutator through which the currents are delivered to the field-magnet coils, the whole constituting an alternate-current electric motor, an electric generator actuated by the movements of the motor, and connections from the generator through the field-magnet of the motor whereby the latter is excited by currents generated by the motor.

In testimony whereof I have hereunto subscribed my name this 6th day of December, A. D. 1887.

WILLIAM STANLEY, JR.

Witnesses:
DANIEL W. EDGECOMB,
CHARLES A. TERRY.